US008912676B2

United States Patent
Matzen et al.

(10) Patent No.: US 8,912,676 B2
(45) Date of Patent: Dec. 16, 2014

(54) WIND ENERGY INSTALLATION AND METHOD FOR OPERATING A WIND ENERGY INSTALLATION WITH TEMPERATURE MONITORING FOR THE TRANSFORMER

(75) Inventors: Bjoern Matzen, Bollingstedt (DE); Lars Nietmann, Albersdorf (DE); Jan Boetger, Bad Oldesloe (DE); Sebastian Schluricke, Flensburg (DE)

(73) Assignee: Senvion SE, Hamburg (DE)

( * ) Notice: Subject to any disclaimer, the term of this patent is extended or adjusted under 35 U.S.C. 154(b) by 0 days.

(21) Appl. No.: 13/823,614

(22) PCT Filed: Nov. 15, 2011

(86) PCT No.: PCT/EP2011/070153
§ 371 (c)(1),
(2), (4) Date: Mar. 14, 2013

(87) PCT Pub. No.: WO2012/065992
PCT Pub. Date: May 24, 2012

(65) Prior Publication Data
US 2013/0181451 A1   Jul. 18, 2013

(30) Foreign Application Priority Data

Nov. 17, 2010   (DE) .......................... 10 2010 051 675

(51) Int. Cl.
*F03D 9/00* (2006.01)
*H02P 9/04* (2006.01)
*H02P 9/02* (2006.01)
*F03D 11/00* (2006.01)

(52) U.S. Cl.
CPC   *H02P 9/02* (2013.01); *F03D 9/003* (2013.01); *Y02E 10/722* (2013.01); *F03D 11/0091* (2013.01)

USPC ............................................... 290/44; 290/55

(58) Field of Classification Search
CPC ... Y02E 10/722; F03D 11/00; F05B 2260/20; F05B 2260/80; F05B 2260/821; H02J 3/386; G05B 23/0283; H02B 1/56; H02H 3/085
USPC ....................................................... 290/44, 55
See application file for complete search history.

(56) References Cited

U.S. PATENT DOCUMENTS 3,555,355 A * 1/1971 Pfister et al. .................... 361/27
3,970,915 A * 7/1976 Suchko ........................ 363/126

(Continued)

FOREIGN PATENT DOCUMENTS

DE   10 2008 034 531   8/2009
WO   WO-03/014629   2/2003

OTHER PUBLICATIONS

International Search Report mailed Apr. 19, 2012, directed to International Application No. PCT/EP2011/070153; 4 pages.

(Continued)

*Primary Examiner* — Pedro J Cuevas
(74) *Attorney, Agent, or Firm* — Morrison & Foerster LLP

(57) ABSTRACT

A wind turbine having a generator for generating electrical energy and a transformer is disclosed. The transformer is designed to receive electrical energy from the generator on a secondary side and to discharge said electrical energy again on a primary side at a higher voltage. The wind turbine also comprises a temperature monitoring means for the transformer. The voltage supply to the temperature monitoring means is fed from the primary side of the transformer. The temperature monitoring means is thereby independent of the control system of the wind turbine. The temperature monitoring means reduces the risk of the transformer overheating. A method for operating such a wind turbine is also disclosed.

12 Claims, 2 Drawing Sheets

(56) References Cited

U.S. PATENT DOCUMENTS

| | | | |
|---|---|---|---|
| 7,280,376 B2* | 10/2007 | McDonald et al. | 363/20 |
| 7,837,126 B2* | 11/2010 | Gao | 236/44 C |
| 8,108,080 B2* | 1/2012 | Wakata et al. | 700/286 |
| 8,154,235 B2* | 4/2012 | Kestermann et al. | 318/400.21 |
| 8,390,140 B2* | 3/2013 | Bolln et al. | 290/44 |
| 8,601,804 B2* | 12/2013 | Akashi et al. | 60/398 |
| 8,632,303 B2* | 1/2014 | Akashi et al. | 415/176 |
| 8,640,478 B2* | 2/2014 | Kim et al. | 62/259.1 |
| 8,710,689 B2* | 4/2014 | Letas | 290/55 |
| 2010/0133824 A1* | 6/2010 | Gao | 290/44 |
| 2010/0207397 A1* | 8/2010 | Kestermann et al. | 290/55 |
| 2010/0327584 A1 | 12/2010 | Fortmann | 290/44 |
| 2011/0062151 A1* | 3/2011 | Tassan-Mang-Ina et al. | 219/690 |
| 2011/0140428 A1* | 6/2011 | Wakata et al. | 290/44 |
| 2011/0144814 A1* | 6/2011 | Menke | 700/287 |
| 2011/0211958 A1* | 9/2011 | Sato et al. | 416/95 |
| 2012/0124984 A1* | 5/2012 | Akashi et al. | 60/398 |
| 2012/0165985 A1* | 6/2012 | Xia et al. | 700/259 |
| 2013/0187389 A1* | 7/2013 | Thangamani et al. | 290/55 |
| 2013/0329343 A1* | 12/2013 | Schwaiger | 361/603 |

OTHER PUBLICATIONS

International Preliminary Report on Patentability dated May 21, 2013, directed to International Application No. PCT/EP2011/070153; 9 pages.

* cited by examiner

WIND ENERGY INSTALLATION AND METHOD FOR OPERATING A WIND ENERGY INSTALLATION WITH TEMPERATURE MONITORING FOR THE TRANSFORMER

REFERENCE TO RELATED APPLICATIONS

This application is a national stage application under 35 USC 371 of International Application No. PCT/EP2011/070153, filed Nov. 15, 2011, which claims the priority of German Application No. 10 2010 051 675.9, filed Nov. 17, 2010, the entire contents of which are incorporated herein by reference.

FIELD OF THE INVENTION

The invention relates to a wind energy installation having a generator for generating electrical energy and having a transformer. The transformer receives electrical energy from the generator on a secondary side and outputs said electrical energy again at a higher voltage on a primary side. The wind energy installation further comprises a temperature-monitoring means for the transformer. The invention also relates to a method for operating a wind energy installation of this type.

BACKGROUND OF THE INVENTION

Conventionally, the control system for the wind energy installation is responsible for monitoring the temperature of the transformer. Information about the temperature of the transformer is processed in the control system. If the temperature exceeds predefined limit values, the control system initiates suitable countermeasures. For example, a cooling means may be put into operation or the transformer may be isolated from the mains. This temperature monitoring is dependent on the control system of the wind energy installation being in operation.

SUMMARY OF THE INVENTION

The problem addressed by the invention is that of providing a wind energy installation and a method for operating a wind energy installation in which the risk of damage to the transformer is reduced. Proceeding from the prior art mentioned at the outset, the problem is solved by means of the features as broadly described herein. Advantageous embodiments are found in the detailed embodiments described below. In the case of the wind energy installation, the invention provides that the voltage supply for the temperature-monitoring means is fed from the primary side of the transformer.

The invention has identified that there are phases during the operation of a wind energy installation in which the control system of the wind energy installation is not in operation but in which the primary side of the transformer is nevertheless connected to the mains without transferring appreciable power into the mains. In particular, this state regularly arises before a wind energy installation is first put into operation. The transformer already has the primary side connected to the medium-voltage network while the wind energy installation is not yet in operation. All of the no-load power of the transformer is then converted into heat. There is the danger of overheating since no protective measures can be initiated by the control system. The transformer can be destroyed within a few hours.

In the case of the wind energy installation according to the invention, the temperature-monitoring means is independent of the control system of the wind energy installation and has its own power supply, which is permanently connected to the transformer. As soon as the primary side of the transformer is connected to the mains, the voltage supply is also available for the temperature-monitoring means. It is ensured that the temperature of the transformer cannot increase unnoticed and the transformer cannot suffer damage as a result.

The voltage on the primary side of the transformer is regularly higher than 10 kV and lies in the range between 10 kV and 33 kV, for example. The operating voltage of the temperature-monitoring means is substantially lower, for example in the order of 100 V. Preferably, a voltage transformer, which is used to convert the voltage present on the primary side of the transformer into a suitable auxiliary operating voltage for the temperature-monitoring means, is provided. The auxiliary operating voltage is preferably lower than 500 V, more preferably lower than 200 V. In many cases, the auxiliary operating voltage is a different voltage than the voltage on the secondary side of the transformer.

Temperature sensors are regularly configured such that they have an electrical resistance for which the value changes as a function of the measured temperature. The temperature sensor is preferably a PTC thermistor for which the electrical resistance increases with temperature. There is normally a continuous relationship between the temperature and the electrical resistance. In order to be able to determine when a predefined temperature limit value has been exceeded, the PTC thermistor can be combined with a PTC thermistor triggering device. If the electrical resistance of the PTC thermistor exceeds a predefined limit value, the PTC thermistor triggering device outputs a signal and countermeasures can be triggered.

If the transformer has a power breaker which can be used to isolate the primary side of the transformer from the mains, the countermeasures can consist in opening the power breaker. Preferably, an energy store is provided for the power breaker, which energy store can be used to open the power breaker without additional power having to be supplied from outside. For this purpose, the voltage transformer can be designed to charge said energy store too.

Alternatively or in addition, the countermeasures can also consist in starting up a cooling means for the transformer. For this purpose, the voltage transformer can be designed to supply the cooling means too with electrical energy. In one advantageous embodiment, a cooling means is started up in the event that a first temperature limit value is exceeded, and the power breaker is opened in the event that a second, higher temperature limit value is exceeded.

The temperature is preferably measured in a region of the transformer in which the voltage is lower than on the primary side of the transformer. The lower the voltage, the higher the current intensity and therefore the larger the amount of heat introduced into the transformer. The temperature measurement can, for example, take place on the secondary side of the transformer. If the transformer is operated under no-load conditions, the temperature increases in the core of the transformer rather than in the windings. For this reason, the temperature measurement preferably relates to the core of the transformer. The temperature limit value at which the transformer must be isolated from the mains can be 150° C., for example.

The voltage transformer responsible for the voltage supply for the temperature-monitoring means can also be used to supply other functions on the primary side of the transformer with voltage. For example, these functions can be a voltage measurement or a power measurement on the primary side of the transformer.

In addition to the first temperature-monitoring means according to the invention, which is supplied with voltage from the primary side of the transformer, a second temperature-monitoring means can be provided which is independent of the primary side of the transformer. The second temperature-monitoring means can, for example, be connected to the control system of the wind energy installation.

During normal operation of the wind energy installation, the first temperature-monitoring means and the second temperature-monitoring means can be active in parallel with one another. A higher temperature limit value is preferably assigned to the first temperature-monitoring means than to the second temperature-monitoring means. Suitable measures for cooling the transformer can be taken by means of the control system of the wind energy installation if the lower temperature limit value of the second temperature-monitoring means is exceeded. Such measures can include switching on a cooling means or reducing the output power, for example. The higher temperature limit value of the first temperature-monitoring means is only exceeded when said measures are not effective. This provides additional safety against overheating of the transformer.

The invention also relates to a method for operating a wind energy installation of this type. The method involves tapping off the voltage on the primary side of the transformer and converting said voltage into a lower auxiliary operating voltage. The transformer is the main transformer of the wind energy installation, and receives electrical energy from the generator on the secondary side and outputs said electrical energy again at a higher voltage on the primary side. A temperature-monitoring means for the transformer is operated using the auxiliary operating voltage tapped off on the primary side. The auxiliary operating voltage can be a different voltage than the voltage present on the secondary side of the transformer. If it is detected that a temperature limit value has been exceeded, a countermeasure can be taken in order to avoid a further increase in temperature. For example, the countermeasure can consist in isolating the primary side the transformer from the mains. The temperature measurement for the temperature-monitoring means is preferably performed on the secondary side of the transformer. The method can be combined with further features which have been described above with respect to the wind energy installation according to the invention.

BRIEF DESCRIPTION OF THE DRAWINGS

The invention will be described by way of example in the following text on the basis of an advantageous embodiment and with reference to the appended drawings, in which.

DETAILED DESCRIPTION OF THE INVENTION

Figure 1:
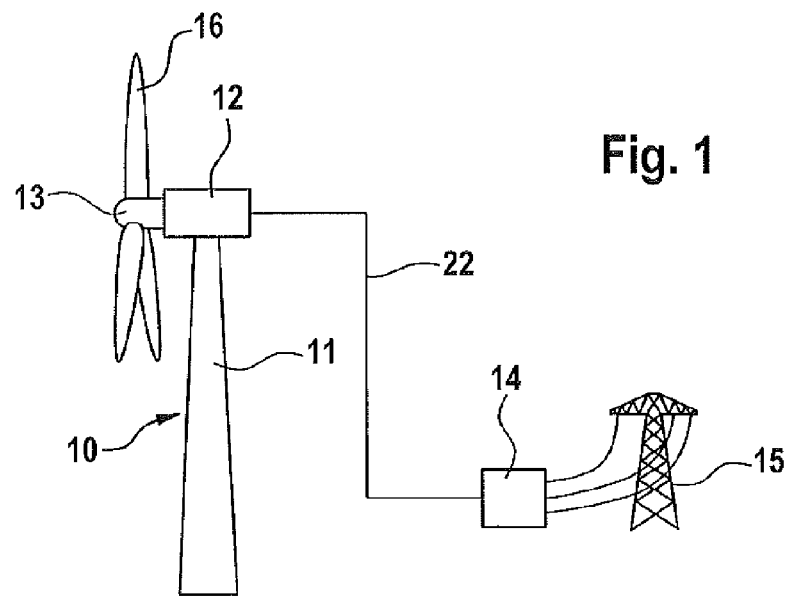
FIG. 1 shows a schematic illustration of a wind energy installation.
Figure 2:
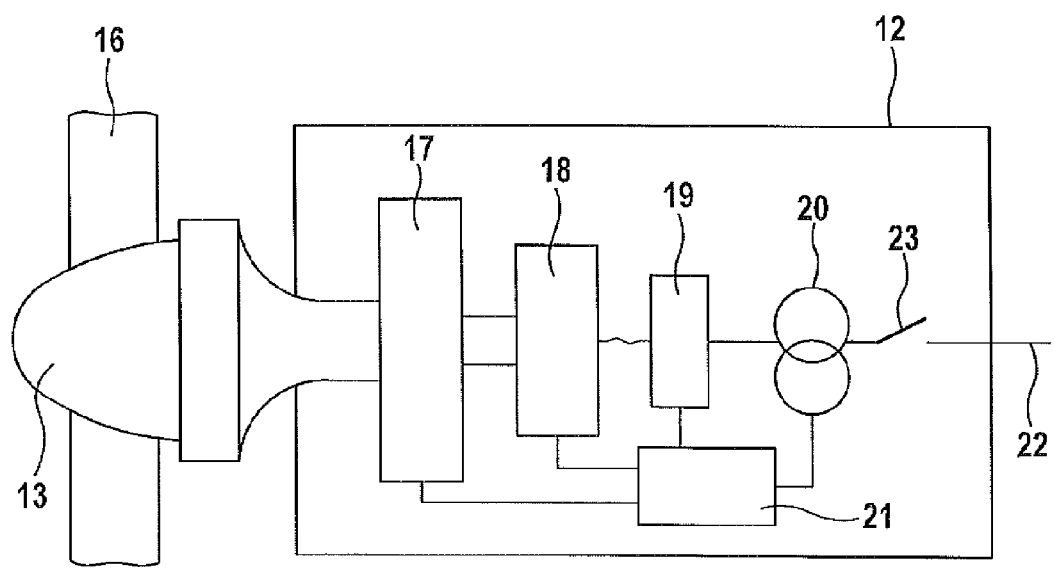
FIG. 2 shows an enlarged illustration of components of the wind energy installation from FIG. 1.

A wind energy installation 10 in FIG. 1 comprises a machine housing 12 arranged on a tower 11. A rotor 13 having three rotor blades 16 is mounted in the machine housing 12, said rotor being connected to a generator 18 via a gear mechanism 17 which is shown in FIG. 2. The electrical energy which is generated by the generator is output via an inverter 19 and a transformer 20 to a medium-voltage network 22. The electrical energy is directed to a transfer point 14 via the medium-voltage network 21 and is transferred from said transfer point to a power distribution network 15. The wind energy installation 10 is usually combined with a plurality of further wind energy installations to form a wind farm, wherein the electrical energy from the wind energy installations is brought together at the transfer point 14. A control system 21 controls the interaction of the components of the wind energy installation.

The electrical energy at a voltage of, for example, 660 V is routed from the inverter 19 to the secondary side of the transformer 20. A conversion to a higher voltage of, for example, 30 kV takes place in the transformer 20. At this voltage, the electrical energy is transferred from the primary side of the transformer 20 to the medium-voltage network 22. A power breaker 23, which can be used to interrupt the flow of current, is arranged on the primary side of the transformer 20. If the wind energy installation is in operation and is feeding electrical energy into the mains, both switches 23, 24 are closed.

The state can arise where the switch 23 is closed and, as a result, a connection exists from the medium-voltage network 22 to the transformer 20 while little or no power is transferred via the transformer. The transformer 20 is then operating under no-load conditions, which is associated with a power loss of approximately 10 kW. This power loss is converted into heat and causes the transformer 20 to heat up. If the switch 24 is open, the wind energy installation 10 as a whole is often also out of operation. This state regularly arises, for example, before the wind energy installation 10 is first put into operation. If the wind energy installation 10 is out of operation, the transformer 20 is not subject to any control by the control system 21.

The invention introduces a temperature-monitoring means for the transformer 20, which means prevents the transformer 20 from overheating in this operating state.

Figure 3:
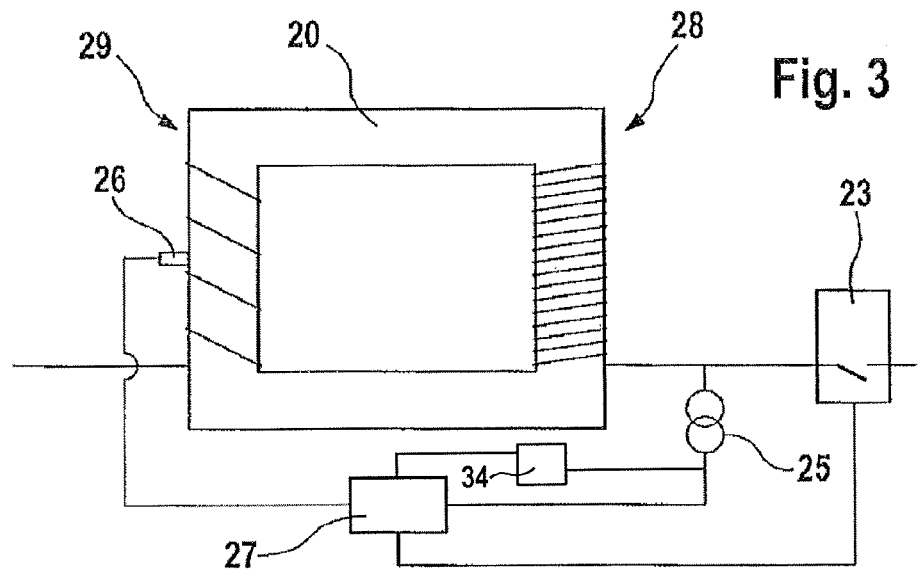
FIG. 3 shows an enlarged illustration of the transformer from FIG. 2.

As shown in FIG. 3, a voltage transformer 25 is arranged on the primary side 28 of the transformer 20. The voltage transformer 25 converts the medium voltage of 30 kV to an auxiliary operating voltage of, for example, 230 V. The temperature-monitoring means for the transformer 20 is operated using this auxiliary operating voltage. The temperature-monitoring means comprises a temperature sensor 26 in the form of a PTC thermistor and a PTC thermistor triggering device 27. The temperature sensor 26 measures the temperature of the core of the transformer 20 on the secondary side 29, because the danger of overheating while the transformer 20 is operating under no-load conditions is greatest there. The PTC thermistor comprises an electrical resistance for which the value changes depending on the measured temperature. The higher the temperature, the greater the electrical resistance of the PTC thermistor.

The electrical resistance of the PTC thermistor is monitored by means of the PTC thermistor triggering device 27. If the electrical resistance exceeds a predefined limit value, the PTC thermistor triggering device 27 outputs a signal to the power breaker 23, with the result that the power breaker 23 is opened. If appropriate, an energy store, from which the actuation of the power breaker 23 is powered, can be provided. The predefined limit value can, for example, be chosen such that it is exceeded when the temperature in the core of the transformer 20 is 150° C. After the power breaker 23 has been opened, no further energy is supplied to the transformer 20 and there is no risk of further heating. Alternatively or in addition to opening the power breaker 23, cooling system 34 for the transformer 20 can also be started up.

Figure 4:
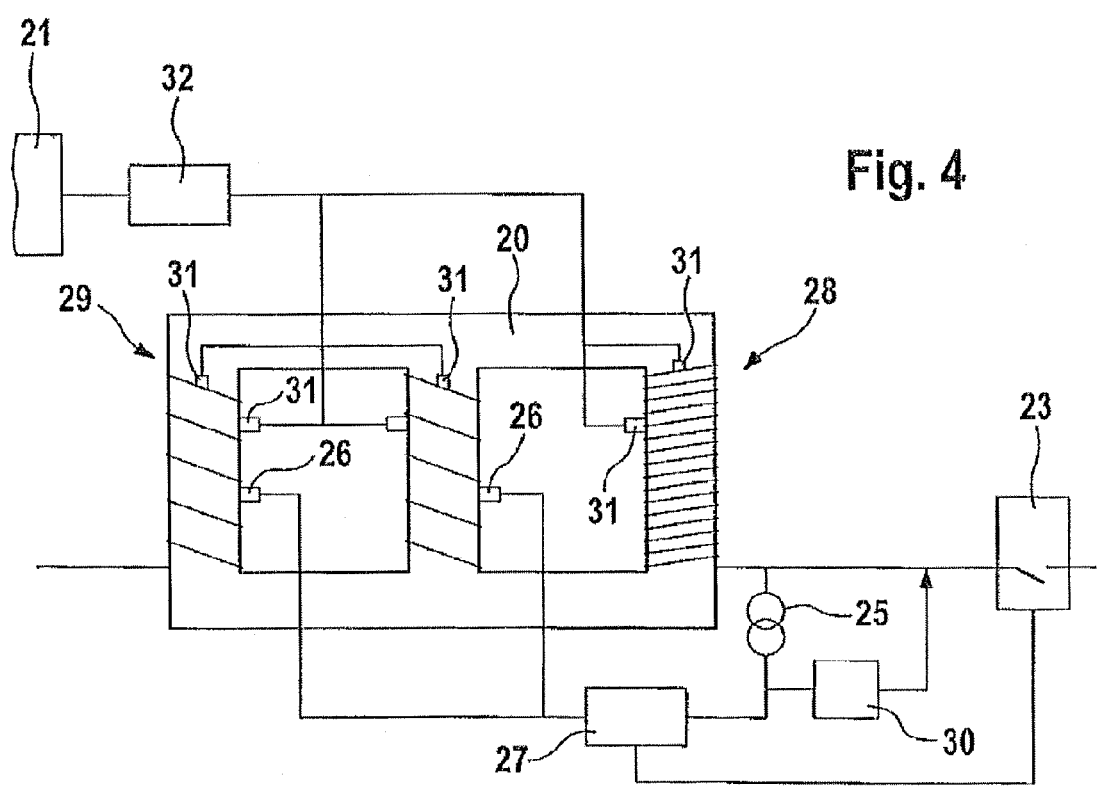
FIG. 4 shows the view from FIG. 3 in the case of another embodiment of the invention.

In an alternative embodiment, which is shown in FIG. 4, the transformer 20 comprises, in addition to the 660 V on the secondary side 29 and the 30 kV on the primary side 28, a third voltage level of 950 V or 6600 V. The voltage transformer 25 is again used to tap off the medium voltage on the primary side 28 of the transformer 20 and to convert it into an auxiliary operating voltage of 100 V. A temperature-monitoring means comprising a PTC thermistor triggering device 27 and two temperature sensors 26 is operated using the auxiliary operating voltage. The temperature sensors 26 measure the temperature of the core of the transformer 20. One of the temperature sensors is arranged at the 660 V level and the other at the 950 V level. If the electrical resistance in one of the temperature sensors 26 exceeds a predefined limit value, the PTC thermistor triggering device 27 triggers and the power breaker 23 is opened.

In addition, a measuring device 30 can also be operated using the auxiliary operating voltage. For this purpose, the measuring device 30 is configured to perform voltage and power measurements on the primary side 28 of the transformer 20.

Moreover, a plurality of further temperature sensors 31 is arranged on the transformer 20, said sensors being connected to the control system 21 of the wind energy installation 10 via a PTC thermistor triggering device 32. The temperature of the transformer 20 is monitored by means of said temperature sensors 31 during normal operation of the wind energy installation. The temperature sensors 31 measure both the temperature in the core of the transformer 20 and that in the windings.

During normal operation of the wind energy installation 10, the temperature-monitoring means having the temperature sensors 31 and the PTC thermistor triggering device 32 can operate in parallel with the temperature-monitoring means having the temperature sensors 26 and the PTC thermistor triggering device 27. The temperature signals from the temperature sensors 31 are processed in the control system 21 of the wind energy installation 10. If one of the temperatures exceeds a predefined limit value, the control system 21 takes suitable measures to lower the temperature in the transformer 20 again. The control system 21 will primarily initiate active cooling measures, for example will switch on a ventilation means. If this is not sufficient, the power output of the wind energy installation 10 can be adapted. As a final measure, which can be triggered by the PTC thermistor triggering device 32, for example, the wind energy installation 10 is switched off. The temperature limit values at which these countermeasures are taken in the control system 21 are lower than the temperature limit value at which the PTC thermistor triggering device 27 triggers and the power breaker 23 is opened. The temperature-monitoring means with the temperature sensor 26 and the PTC thermistor triggering device 27 therefore provides a second level of safety if the temperature in the transformer 20 increases further despite the countermeasures of the control system 21.

The invention claimed is:

1. A wind energy installation comprising a generator configured to generate electrical energy, a transformer configured to receive electrical energy from the generator on a secondary side and to output said electrical energy at a higher voltage on a primary side, and a temperature-monitoring system for the transformer, wherein the voltage supply for the temperature-monitoring system is fed from the primary side of the transformer.

2. The wind energy installation of claim 1, comprising a voltage transformer configured to convert the voltage present on the primary side of the transformer into a suitable auxiliary operating voltage for the temperature-monitoring system.

3. The wind energy installation of claim 1, wherein the temperature-monitoring system comprises a PTC thermistor and a PTC thermistor triggering device.

4. The wind energy installation of claim 1, wherein the temperature-monitoring system is configured to isolate the primary side of the transformer from the mains in response to a predefined temperature limit value being exceeded.

5. The wind energy installation of claim 1, wherein the temperature-monitoring system is configured to put a cooling system for the transformer into operation in response to a predefined temperature limit value being exceeded.

6. The wind energy installation of claim 1, wherein a temperature sensor of the temperature-monitoring system is arranged in a region of the transformer in which the voltage is lower than on the primary side of the transformer.

7. The wind energy installation of claim 1, wherein a temperature sensor of the temperature-monitoring system is arranged at the core of the transformer.

8. The wind energy installation of claim 1, comprising a measuring device for the voltage on the primary side of the transformer and wherein the voltage supply for the measuring device is fed from the primary side of the transformer.

9. The wind energy installation of claim 1, comprising a second temperature-monitoring system and wherein the second temperature-monitoring system is connected to the control system of the wind energy installation.

10. The wind energy installation of claim 9, wherein the first temperature-monitoring means and the second temperature-monitoring system are active in parallel when the wind energy installation is in operation.

11. The wind energy installation of claim 10, wherein a higher temperature limit value is assigned to the first temperature-monitoring system than to the second temperature-monitoring system.

12. A method for operating a wind energy installation having a generator configured to generate electrical energy and a transformer configured to receive electrical energy from the generator on a secondary side and to output said electrical energy at a higher voltage on a primary side comprising:
tapping off the voltage on the primary side of the transformer;
converting the voltage into a lower auxiliary operating voltage; and
operating a temperature-monitoring system for the transformer using the auxiliary operating voltage.

* * * * *

UNITED STATES PATENT AND TRADEMARK OFFICE
CERTIFICATE OF CORRECTION

| | |
|---|---|
| PATENT NO. | : 8,912,676 B2 |
| APPLICATION NO. | : 13/823614 |
| DATED | : December 16, 2014 |
| INVENTOR(S) | : Bjoern Matzen et al. |

Page 1 of 1

It is certified that error appears in the above-identified patent and that said Letters Patent is hereby corrected as shown below:

In the Claims,

Column 6, line 39, at claim 10, please delete "means-and" and insert --system and--.

Signed and Sealed this
Twelfth Day of May, 2015

Michelle K. Lee
*Director of the United States Patent and Trademark Office*